United States Patent [19]

Chiu

[11] 4,410,995
[45] Oct. 18, 1983

[54] CASCADED DYE LASER CAVITIES

[75] Inventor: Pay H. Chiu, London, Canada

[73] Assignee: Photochemical Research Associates Inc., London, Canada

[21] Appl. No.: 302,506

[22] Filed: Sep. 16, 1981

[51] Int. Cl.³ .............................................. H01S 3/10
[52] U.S. Cl. ...................................... 372/69; 372/53; 372/97; 372/68
[58] Field of Search ..................... 372/53, 68, 97, 51, 372/26; 372/69

[56] References Cited

U.S. PATENT DOCUMENTS 3,832,649 8/1974 Feichtner .............................. 372/68
3,903,483 9/1975 Shajenko ............................... 372/53
4,201,951 5/1980 Mohler .................................. 372/68

Primary Examiner—James W. Davie
Assistant Examiner—Leon Scott, Jr.
Attorney, Agent, or Firm—Sim & McBurney

[57] ABSTRACT

A method and apparatus for producing stable and reproducible ultra-short lasing radiation pulses are disclosed. The duration of incoming pumping pulses for the dye laser arrangement is reduced in stages to produce the ultra-short pulses. A first dye laser cavity of a series of at least two cascaded dye laser cavities is excited with lasing radiation pulses. The lasing radiation pulses emerging from each dye laser cavity of the series are directed into the next successive dye laser cavity of the series. The photon cavity lifetime of each dye laser cavity of the series is sufficient for a given duration of the incoming pumping pulses to produce the ultra-short pulses emerging from the final dye laser cavity of the series. The maximum photon cavity lifetime of each dye laser cavity of the series is selected to thereby reduce in stages the duration of the incoming pumping pulses. This reduction yields from the final dye laser cavity of the series the ultra-short lasing radiation pulses.

15 Claims, 4 Drawing Figures

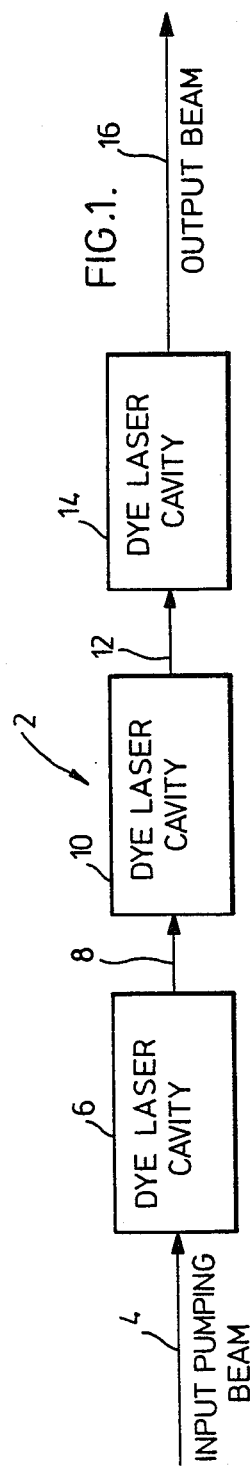
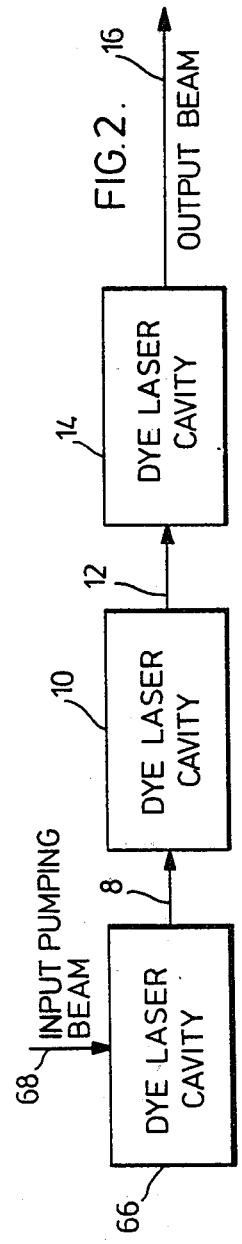
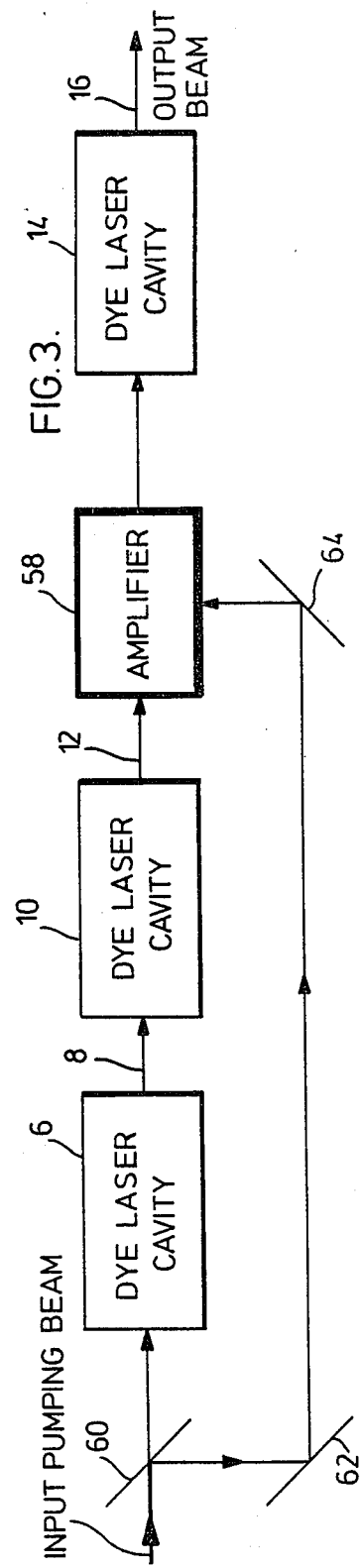

CASCADED DYE LASER CAVITIES

FIELD OF THE INVENTION

This invention relates to dye lasers. More particularly, the invention relates to a method and apparatus for producing stable and reproducible ultra-short lasing radiation pulses from dye laser cavities.

BACKGROUND OF THE INVENTION

There are several applications for lasing radiation pulses having a duration in the picosecond regime including ultra-short time resolving spectroscopy. For most applications, it is desirable to produce stable and reproducible ultra-short lasing radiation pulses. By stable pulses it is meant pulses that are essentially a single well defined pulse. However, by referring to stable pulses it is not intended to preclude the possibility of single well defined pulses which may be followed by relatively small damped relaxation oscillations or ringing. A pulse would not be classified as stable if it is followed by damped relaxation oscillations that have an amplitude in excess of a significant percentage of the maximum amplitude of the initial or single well defined pulses. Reproducibility of the pulses is the requirement that all the pulses are stable pulses notwithstanding variations in the power or duration of the incoming pumping pulses.

In the past, laser systems using mode-locking have been used to produce pulses having a duration of approximately 10 picoseconds or less. However, these systems are very expensive, have low output power, require considerable maintenance and have a limitation in their output wavelength.

In the Journal of Applied Physics, Volume 37, No. 5 (1966) 2004, D. Roess, developed a "Resonator Transient" theory. This theory proposed the method of pulse shortening by pumping a laser oscillator or cavity having transient characteristics such that the resulting pulse is shorter than the pump pulse.

Hereinafter the duration of a pulse will be taken to mean the commonly accepted definition of full width half maximum. That is to say, the duration of that portion of the pulse which is in excess of one half of the maximum amplitude of the pulse.

H. Salzmann and H. Strohwald, Physics Letter 57A (1976) 41 report emission of 10 picosecond pulses from a longitudinally pumped dye laser cell with a 0.04 picosecond photon cavity lifetime. Because of the extremely short photon cavity lifetime, single pulses could only be obtained when pumping was just above the threshold. Threshold is the minimum pumping energy required to produce a lasing action in the dye laser cavity. A further example of the difficulty involved in the pumping of a single stage dye laser cavity is reported in E. Aussenegg and A. Leitner, Optics Communication, Vol. 32 No. 1, p. 121. For resonator lengths of less than 0.5 mm, which resulted in a photon cavity lifetime of approximately 8 picoseconds, an irregular sequence of relaxation pulses was observed. With a resonator length of 0.5 mm the duration of the output pulses from the dye laser cavity was approximately 50 picoseconds.

In the Salzmann and Strohwald experiments the dye laser cell was pumped by a high pressure nitrogen laser producing pulses having a duration of approximately 100 picoseconds. In the Aussenegg and Leitner experiments the dye laser cavity was pumped with pulses having a duration of approximately 300 picoseconds. Aussenegg and Leitner note that if the pump pulses were shortened by raising the nitrogen laser pressure, a corresponding reduction of the dye laser resonator length should yield pulses shorter than 10 picoseconds. However, there are attendant problems with generating short duration pumping pulses by increasing the pressure in the nitrogen laser. Practical nitrogen lasers have an output duration of approximately 300 picoseconds or more. Eximer lasers having the same physical configuration as the aforementioned nitrogen lasers are also excellent pumping sources but they have output durations of approximately 1 nanosecond.

In practice, the duration of the pumping pulses can vary over a broad range. This variation has made it impractical to produce stable and reproducible ultra-short lasing radiation pulses emerging from just one dye laser cavity. As Aussenegg and Leitner note, Salzmann and Strohwald could only obtain single pulses when the cavity was pumped close above threshold with their extremely short photon cavity lifetime. Variations in the pumping pulses would produce washable pulses.

In the IEEE Journal of Quantum Electronics, Volume QE-11, No. 8, August 1975, Shinlon Lin reports a study of relaxation oscillations in organic dye lasers. He demonstrates that when the ratio of the pumping power to the threshold power of the dye laser is decreased, the output from the dye laser goes from uncontrolled spiking to a sequence of well defined damped relaxation oscillations to a single spike output. Consistent with the Aussenegg and Leitner experiments, he shows that with the choice of particular parameters for the dye laser cavity a single spike of a duration considerably shorter than that of the pumping pulse can be produced by carefully controlling the pumping power.

Therefore, in the past it has been impossible to reliably produce stable ultra-short lasing radiation pulses having a duration of less than 50 picoseconds other than by the mode-locking method. This is due to the fact that as the ratio of the duration of the pumping pulse to the photon cavity lifetime of the dye laser cavity becomes too large, stable pulses can only be obtained when the pumping power is very close to threshold. This critical limitation on the pumping power, coupled with the fact that each pumping pulse might not have exactly the same power and duration, has made it impractical to produce stable and reproducible ultra-short lasing radiation pulses of duration less than 50 picoseconds in the past.

If only a single dye laser cavity is used it is impossible to reliably produce ultra-short lasing radiation pulses having a duration of less than 50 picoseconds when the cavity is pumped by pulses having a duration in excess of 300 picoseconds. If the photon cavity lifetime is chosen so that sufficiently short pulses are produced, the resultant pulses will not be stable and reproducible. In the past, the use of a single dye laser cavity has resulted in a trade-off between reproducibility and shortness of duration, both factors being impossible to achieve simultaneously.

One example of a cascade pumping scheme is reported by K. Kato in "IEEE Journal of Quantum Electronics", July 1976, 442. A first dye laser was pumped in an off axis longitudinal pumping scheme. The lasing radiation emerging from this dye laser was directed into a second dye laser, also in the off axis longitudinal pumping scheme. The first dye laser cavity was 30 cm long and the second dye laser cavity was 40 cm long.

This arrangement was not for the purpose of producing ultra-short lasing radiation output pulses but rather was for the purpose of matching the pump wavelengths to the principal absorption hands of the dye compounds used in the dye lasers. The utility of the cascade pumping scheme was clearly demonstrated by the fact that about a 9 percent overall energy conversion efficiency was obtained whereas direct pumping of the dye in the second dye laser cavity resulted in an energy conversion effeciency of less than 1 percent. Although cascade pumping schemes have been used in dye laser arrangements in the past, they have been used for the purpose of overall energy conversion efficiency and flexibility in the output lasing radiation wavelength rather than for the purpose of producing stable and reproducible ultra-short lasing radiation pulses. The present invention uses a cascaded pumping scheme for dye laser cavities where the photon cavity lifetime of each dye laser cavity is chosen so that stable and reproducible ultra-short lasing radiation pulses emerge from the final stage.

SUMMARY OF THE INVENTION

The method, according to this invention, produces stable and reproducible ultra-short lasing radiation pulses. The arrangement, according to this invention, provides an apparatus for the production of stable and reproducible ultra-short lasing radiation pulses by reducing in stages the duration of incoming pumping pulses for the dye laser arrangement to produce the ultra-short pulses. The apparatus in which the method is carried out comprises a series of at least two cascaded dye laser cavities. The first dye laser cavity of the series is excited by input lasing radiation pulses. Lasing radiation pulses emerging from each dye laser cavity of the series are directed into the next successive dye laser cavity of the series. The photon cavity lifetime of each dye laser cavity of the series is sufficient for a given duration of the incoming pumping pulses to produce the ultra-short pulses emerging from the final dye laser cavity of the series. The maximum photon cavity lifetime of each dye laser cavity of the series is selected to thereby reduce in stages, the duration of incoming pumping pulses to yield the ultra-short pulses from the final dye laser cavity of the series.

The optimal absorption wavelength of the lasing medium dye solution of each dye laser cavity of the series is close to or approximately equal to the wavelength of the lasing radiation pulses emerging from the prior dye laser cavity of the series. The arrangement may also be provided with a dye amplifier cell positioned either after the last dye laser cavity of the series or between two dye laser cavities of the series.

BRIEF DESCRIPTION OF THE DRAWINGS

Preferred embodiments of the apparatus, according to the invention, in which the preferred method is carried out, are shown in the drawings wherein:

FIG. 1 is a schematic view of the dye laser arrangement showing a series of three cascaded dye laser cavities;

FIG. 2 is a schematic view of the dye laser arrangement showing a series of three cascaded dye laser cavities with the first dye laser cavity being transversely pumped;

FIG. 3 is a schematic view of the dye laser arrangement with an amplifier cell placed between the second and third dye laser cavities; and, FIG. 4 is a schematic cross-sectional view of one embodiment of the dye laser arrangement.

DETAILED DESCRIPTION OF THE EMBODIMENTS OF THE INVENTION

Figure 4:
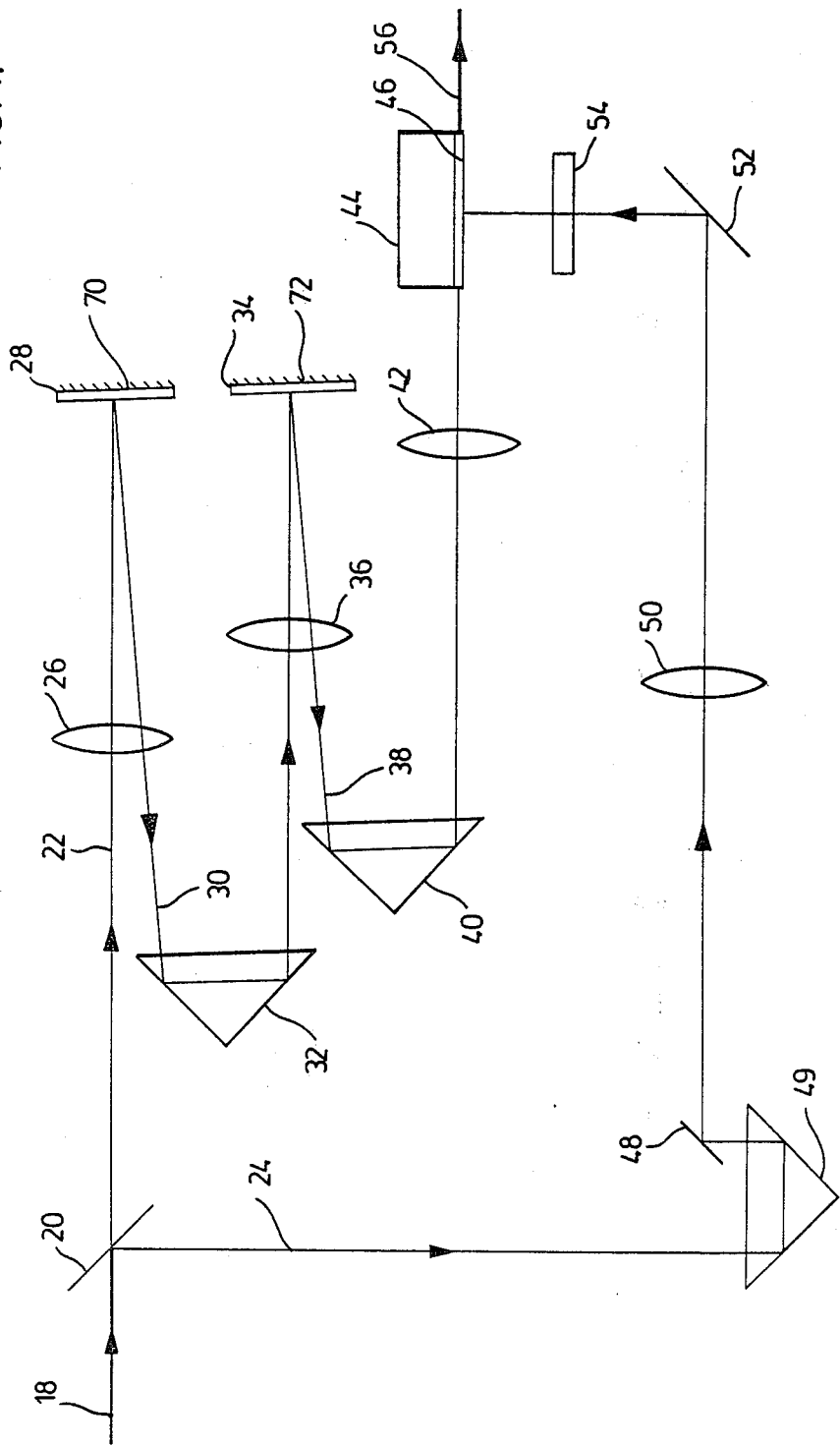

A schematic view of a series of three cascaded dye laser cavities is shown generally as 2 in FIG. 1. An input pumping beam consisting of lasing radiation pulses 4 excites the first dye laser cavity 6. The lasing radiation pulses 8 emerging from the first dye laser cavity 6 are directed into a second dye laser cavity 10. The lasing radiation pulses 12 emerging from the second dye laser cavity 10 are directed into a third dye laser cavity 14. The photon cavity lifetime of each dye laser cavity is selected so that the pulses emerging therefrom are shorter than the pulses exciting the dye laser cavity. However, there is a lower bound on the photon cavity lifetime of each dye laser cavity. If the photon cavity lifetime is too small, uncontrolled spiking lasing radiation will emerge from the dye laser cavity. Since it is desired to have stable lasing radiation pulses emerging from the third or final dye laser cavity 14, the photon cavity lifetime of each dye laser cavity of the series must be sufficient for a given duration of the incoming pulses to produce an output beam 16 which is made up of stable and reproducible ultra-short lasing radiation pulses emerging from the third dye laser cavity 14.

In general, the transient characteristics of a dye laser cavity are related to its photon cavity lifetime. The transient characteristics of a dye laser cavity affect the output response of the cavity for a given pumping pulse. For longitudinally pumped dye laser cavities as illustrated in FIG. 4, the photon cavity lifetime is approximated by the product of two times the length of the cell divided by the product of the speed of light times one minus the square root of the product of the reflectivities of the front window and the rear mirror of the dye laser cavity. It will be appreciated to those skilled in the art that for other dye laser cavity arrangements the definition of the photon cavity lifetime must be modified accordingly. The essential point is that for a given dye laser cavity, the photon cavity lifetime, and therefore the transient characteristics of the cavity are related to the length of the cavity and the reflectivities of the surfaces in the cavity. For longitudinally pumped dye laser cavities as illustrated in FIG. 4, it has been determined emperically that the lasing radiation pulses emerging from the dye laser cavity are in the order of three to four times the photon cavity lifetime of the dye laser cavity. With lower pumping powers, the duration of the output pulses decreases somewhat.

For a given dye laser cavity, if the ratio of the duration of the pumping pulse to the photon cavity lifetime of the cavity is too large, stable and reproducible output pulses can only be produced, if at all, when the power of the pumping pulses is very close to threshhold. Therefore, for a given pumping pulse duration exciting a dye laser cavity, it is desirable that the photon cavity lifetime of the dye laser cavity be chosen so that stable and reproducible lasing radiation pulses emerge from the dye laser cavity even when the power of the pumping pulse is significantly higher than the threshold pumping power. To account for fluctuations in the pumping power, in practice it is desirable to choose the ratio of the duration of the pumping pulse to the photon cavity lifetime of the cavity such that stable and reproducible pulses emerge from the cavity even when the cavity is pumped by pulses having a power two to three times that of the threshold pumping power. For a given pumping pulse duration and power, the smallest photon cavity lifetime for a dye laser cavity which produces stable and reproducible lasing radiation pulses can be determined emperically. It follows that a photon cavity lifetime in excess of this minimum will also produce stable and reproducible pulses. A photon cavity lifetime should be chosen such that stable and reproducible lasing radiation pulses emerge from the dye laser cavity and such that the duration of the lasing radiation pulses emerging from the dye laser cavity is less than the duration of the lasing radiation pulses exciting the dye laser cavity. As will be later discussed, it is not strictly necessary that stable and reproducible lasing radiation pulses emerge from the first and intermediate dye laser cavities of the series. To create a lasing action in a dye laser cavity it is necessary that the duration of the pumping pulse be greater than the time it takes radiation to make one round trip in the dye laser cavity. In practice, the photon cavity lifetime is chosen such that there is a significant reduction in duration at each stage.

By way of example, for the type of dye laser cavity as illustrated in FIG. 4, and more particularly described in my pending Canadian Patent Application Ser. No. 379,086 entitled "Longitudinally Pumped Dye Laser Arrangement" it has been determined emperically that if the photon cavity lifetime is in excess of approximately 1/15 of the pumping pulse duration, stable and reproducible pulses can be obtained even when the cavity is pumped two to three times above threshold. Indeed, it has been determined that even when the ratio of the photon cavity lifetime to the pumping pulse duration is as small as approximately one fiftieth, stable and reproducible pulses can be obtained when the cavity is pumped much closer to threshold.

The essential consideration is that the photon cavity lifetime of each dye laser cavity of the series be sufficient for a given duration of the incoming pumping pulses to produce stable and reproducible ultra-short lasing radiation pulses emerging from the final dye laser cavity 14 of the series. Stated another way, for a given duration of incoming pumping pulses, the maximum ratio of the duration of lasing radiation pulses exciting each dye laser cavity of the series to the photon cavity lifetime of that respective dye laser cavity of the series is determined by the maximum possible reduction in pulse duration of the pulse exciting that respective dye laser cavity of the series which produces stable and reproducible ultra-short lasing radiation pulses emerging from the final dye laser cavity of the series. It will be appreciated that for the lasing radiation pulses 8 emerging from dye laser cavity 6 and the lasing pulses 12 emerging from dye laser cavity 10, it is not absolutely essential that they be stable and reproducible. The lasing radiation pulses 8 and 12 may have damped relaxation oscillations. What is important is that the lasing radiation pulses 12 exciting dye laser cavity 14 be such that stable and reproducible ultra-short lasing radiation pulses 16 emerge from the dye laser cavity 14. If the lasing radiation pulses emerging from dye laser cavity 6 and dye laser cavity 10 have damped relaxation oscillations following the initial spike, the damped relaxation oscillations must not be of sufficient power and duration so as to cause a secondary pulse or damped relaxation oscillations to emerge from the final dye laser cavity 14 of the series.

It follows that the photon cavity lifetime for each dye laser cavity of the series need not be fixed at any critical or specific value but may range between the minimum value which will produce stable and reproducible ultra-short lasing radiation pulses emerging from the final dye laser cavity of the series and a value of the photon cavity lifetime which is consistent with reduction in the duration of the pulses at each stage.

By way of example, it has been found that if the ratio of photon cavity lifetime of the first dye laser cavity of the series to the duration of its pumping pulses is approximately one fifteenth, stable and reproducible pulses emerge from the first dye laser cavity of the series. It has been found that this ratio may be decreased to approximately one thirtieth, but then damped relaxation oscillations may emerge from the first dye laser cavity. However, at this ratio any damped relaxation oscillations that do occur do not have sufficient magnitude to create a secondary pulse or damped relaxation oscillations emerging from the final dye laser cavity of the series. For the successive dye laser cavities of the series it has been found that the ratio of the photon cavity lifetime of each dye laser cavity of the series to the duration of the respective exciting pulses may be as low as one fiftieth. This lower ratio in successive stages is possible since the pulses emerging from the first dye laser cavity of the series do not have as large variations in duration and power as the pulses exciting the first dye laser cavity have.

Since the duration of the lasing radiation pulses emerging from said dye laser cavity is less than the duration of the lasing radiation pulses emerging from the prior dye laser cavity of the series, the photon cavity lifetime of each dye laser cavity of the series may be less than the photon cavity lifetime of the prior dye laser cavity of the series. It has also been found possible to provide that the photon cavity lifetime of the first dye laser cavity of the series be in excess of the photon cavity lifetime of each successive dye laser cavity of the series. This is due to the fact that the lasing radiation pulses 8 emerging from the first dye laser cavity have been sufficiently shortened relative to the duration of the input lasing radiation pulses 4 so that even if the photo cavity lifetime of each successive stage is chosen to be the same, the lasing radiation pulses exciting each successive dye laser cavity will not be of such long duration so as to result in unstable pulses emerging therefrom. The inherent pulse shortening characteristics of each dye laser cavity will ensure a reduction of the pulse length of the lasing radiation emerging from each successive stage.

Although the invention has been described thus far as a series of three cascaded dye laser cavities, it will be apparent that either two dye laser cavities or more than three dye laser cavities in series may also be employed. If a large number of dye laser cavities are cascaded in the series it may be necessary to amplify the pulses emerging from one of the intermediate dye laser cavities before directing it into the next successive dye laser cavity since there is a reduction in power of the lasing radiation at each stage.

A schematic cross-sectional view of the dye laser arrangement with a series of two cascaded dye laser cavities is shown generally in FIG. 4. An input beam 18 is split with a suitable dielectric coated beam splitter 20 into two beams 22 and 24. The beam 22 is focused into the dye laser cell 28 by lens 26. The lasing radiation which is reflected by mirror 70 emerges from the dye laser cell 28, is collimated into an essentially parallel beam 30 and directed by prism 32, through lens 36, into the second dye laser cavity 34. The lasing radiation which is reflected by mirror 72 emerges from the dye laser cell 34, is collimated into an essentially parallel beam 38 by lens 36 and directed by prism 40 through lens 42 into a dye amplifier cell 44. The dye amplifier cell 44 has been excited to just below threshold in a linear active region 46, by the suitably optically delayed other portion 24 of the incoming pumping beam 18, which has been reflected by prism 49 and mirror 48, directed through lens 50 further reflected by mirror 52 and focused by cylindrical lens 54. The prism 49 is movable so as to provide an adjustment in the distance the beam 24 travels. This simply provides an adjustment in the optical delay of the beam exciting the amplifier cell 44. Alternatively, the amplifier cell 44 can be pumped by another laser or flash lamps with appropriate electronic syncronization.

The lasing radiation pulses which have been directed by lens 42 into the linear active region 46 of the amplifier cell 44 result in a stimulated emission action occurring in the amplifier cell 44 which results in amplification of the pulses. The length of the amplifier cell 44 is chosen to give a suitable amplification factor but should not be so long as to result in saturation. The amplifier cell may result in a further shortening of the pulses emerging from the second dye laser cell 34. The amplified pulses emerge from the dye amplifier cell as indicated by beam 56.

Since the power conversion efficiency of each dye laser cavity is significantly less than unity, it may be necessary to amplify the lasing radiation emerging from a dye laser cavity. This has been illustrated in FIG. 4 where a dye amplifier cell is positioned relative to the last dye laser cavity of the series for amplifying the lasing radiation pulses emerging therefrom. In FIG. 3 a dye amplifier cell is shown positioned relative to the second dye laser cavity for amplifying the lasing radiation pulses emerging therefrom and directing the amplified pulses into the third dye laser cavity. Similar to the arrangement in FIG. 4, the amplifier 58 may also be excited by splitting the pumping beam by a dielectric beam splitter 60 and directing a portion of it by mirrors 62 and 64 to the amplifier cell.

In FIG. 4, the two dye laser cavities of the series are longitudinally pumped. Usually the second and successive dye laser cavities of the series according to this invention are longitudinally pumped since as a general rule, longitudinally pumped dye laser cavities can be made with shorter photon cavity lifetimes than transversely pumped dye laser cavities. For the first stage however, a transversely pumped dye laser cavity may be used since its photon cavity lifetime need not be as short as the subsequent dye laser cavities' photon cavity lifetimes. As shown generally in FIG. 2, the first dye laser cavity 66 of the series is transversely pumped by an input pumping beam consisting of input pumping pulses 68.

A broad class of lasing medium dye solutions may be used in each dye laser cavity of the series. However, it is desirable that the proper lasing medium dye solutions for each dye laser cavity be chosen so that the optimal absorption wavelengths of the lasing medium dye solutions are matched with the wavelengths of the pumping beams of the laser cavities containing the lasing medium dye solution. Therefore the dye solution of the first dye laser cavity should be chosen so that its optimal absorption wavelength is close to or approximately equal to the wavelength of the lasing radiation pulses exciting the first dye laser cavity. The lasing radiation emerging from the first dye laser cavity will have a wavelength in excess of the wavelength of the lasing radiation pulses exciting the first dye laser cavity. The dye solution of the second dye laser cavity should be chosen so that its optimal absorption wavelength is close to or approximately equal to the wavelength of the lasing radiation pulses emerging from the first dye laser cavity. Similarly, the optimal absorption wavelength of the lasing medium dye solution of each dye laser cavity of the series should be chosen so that it is close to or approximately equal to the wavelength of the lasing radiation pulses emerging from the prior dye laser cavity of the series. It follows that the optimal absorption wavelength of the lasing medium dye solution of each dye laser cavity of the series is in excess of the optimal absorption wavelength of the lasing medium dye solution of the prior dye laser cavity of the series.

To set up this dye laser arrangement the following steps may be employed. Firstly, adjust the laser producing the input pumping pulse to produce a stable and optimal power output. Secondly, adjust the focusing of the lens which is directing the input lasing radiation pulses exciting the first stage of the dye laser cavity such that the lasing radiation pulses emerging therefrom have optimal power. Thirdly, align the successive dye laser cavities and adjust the lenses focusing their pumping beams such that lasing radiation pulses emerging therefrom have optimal power. Fourthly, attenuate the input lasing radiation pulses so that the output of the final dye laser cavity of the series becomes unstable or misfires due to insufficient pumping power. Finally, decrease the attenuation of the input lasing radiation pulses until the lasing radiation pulses emerging from the final dye laser cavity of the series become stable again.

Having generally described this invention, two specific examples which are not intended to be limiting will be given. A series of two longitudinally pumped cascaded dye laser cavities was used. The first dye laser cavity was excited with input lasing radiation pulses from a nitrogen gas laser having an average duration of 350 picoseconds and approximately 50 micro-joules. The photon cavity lifetime of the first dye laser cavity was approximately 21 picoseconds and the photon cavity lifetime of the second dye laser cavity was approximately 3 picoseconds. With 80 percent attenuation on the input lasing radiation pulses, lasing radiation pulses of approximately 100 picoseconds emerged from the first dye laser cavity and these pulses were stable and reproducible. The lasing radiation pulses emerging from the second dye laser cavity of the series were ultra-short (not in excess of 30 picoseconds) and were stable and reproducible. The energy of the lasing radiation pulses emerging from the second dye laser cavity of the series were approximately one half micro-joule. These pulses were amplified by a dye amplifier cell.

In the second example, a series of three cascaded dye lasers was used, the first dye laser cavity being transversely pumped and the second and third dye laser cavities being longitudinally pumped. The first dye laser cavity had a photon cavity lifetime of approximately 150 picoseconds and the second and third dye laser cavities had photon cavity lifetimes of approximately 3 picoseconds. The lasing radiation pulses emerging from the third dye laser cavity were measured as having a duration of less than 20 picoseconds.

In both of these examples the concentration of the lasing medium dye solutions was in the range of $5 \times 10^{-3}$ M to $4 \times 10^{-2}$ M.

Although preferred embodiments of the invention have been described herein in detail, it is to be understood by those skilled in the art, that variations may be made thereto without departing from the spirit of the invention or the scope of the appended claims.

The embodiments of the invention in which an exclusive property or privilege is claimed are defined as follows:

1. A dye laser arrangement for producing stable and reproducible ultra-short lasing radiation pulses by reducing in stages the duration of incoming pumping pulses for said dye laser arrangement to produce said ultra-short pulses, comprising a series of at least two cascaded dye laser cavities, the photon cavity lifetime of each dye laser cavity of said series being sufficient for a given duration of said incoming pumping pulses to produce said ultra-short pulses emerging from a final dye laser cavity of said series, a maximum photon cavity lifetime of each dye laser cavity of said series being selected to thereby reduce in stages duration of said incoming pumping pulses to yield said ultra-short pulses from the final dye laser cavity of said series.

2. The arrangement of claim 1, the photon cavity lifetime of each dye laser cavity of said series being sufficient for a given duration of said incoming pumping pulses to produce pulses emerging therefrom having damped relaxation oscillations.

3. The arrangement of claim 1, the photon cavity lifetime of each dye laser cavity of said series being sufficient for a given duration of said incoming pumping pulses to produce stable and reproducible lasing radiation pulses emerging therefrom.

4. The arrangement of claim 1, said photon cavity lifetime of a first dye laser cavity of said series being greater than said photon cavity lifetime of each remaining dye laser cavity of said series.

5. The arrangement of claim 4, said photon cavity lifetime of said first dye laser cavity of said series being less than one hundred picoseconds.

6. The arrangement of claim 5, said lasing radiation pulses emerging from the final dye laser cavity of said series having a full width half maximum duration less than 50 picoseconds.

7. The arrangement of claim 4, an optimal absorption wavelength of said lasing medium dye solution of each dye laser cavity of said series being close to or approximately equal to the wavelength of the lasing radiation pulses emerging from the prior dye laser cavity of said series.

8. The arrangement of claim 4, the optimal absorption wavelength of the lasing medium dye solution of each dye laser cavity of said series being in excess of the optimal absorption wavelength of the lasing medium dye solution of the prior dye laser cavity in said series.

9. The arrangement of claim 4, said dye laser cavities of said series being longitudinally pumped.

10. The arrangement of claim 4, the first dye laser cavity of said series being transversely pumped and each successive dye laser cavity of said series being longitudinally pumped.

11. The arrangement of claim 1, said photon cavity lifetime of each dye laser cavity of said series being less than said photon cavity lifetime of each prior dye laser cavity of said series.

12. A dye laser arrangement of claim 1 for producing lasing ultra short radiation pulses having a full width half maximum duration not in excess of 50 picoseconds wherein the photon cavity lifetime of the first dye laser cavity of said series is greater than one thirtieth times the duration of the lasing radiation pulses pumping said first dye laser cavity, the photon cavity lifetime of each successive dye laser cavity of said series being greater than one fiftieth times the duration of the lasing radiation pulses exciting the respective dye laser cavity.

13. A dye laser arrangement of claim 1 for producing ultra-short lasing radiation pulses having a full width half maximum duration not in excess of 30 picoseconds wherein two cascaded dye laser cavities are provided which are both longitudinally pumped, the photon cavity lifetime of the first dye laser cavity being approximately 21 picoseconds and the photon cavity lifetime of the second dye laser cavity being approximately 3 picoseconds, the first dye laser cavity being pumped by lasing radiation pulses having a full width half maximum duration of approximately 350 picoseconds.

14. A dye laser arrangement of claim 1 for producing ultra-short lasing radiation pulses having a full width half maximum duration of less than 20 picoseconds wherein three cascaded dye laser cavities are provided, the first dye laser cavity of said series being transversely pumped and having a photon cavity lifetime of approximately 150 picoseconds, the second and third dye laser cavity of said series being longitudinally pumped and having photon cavity lifetimes of approximately 3 picoseconds, the first dye laser cavity being pumped by lasing radiation pulses having a full width half maximum duration of approximately 350 picoseconds.

15. A method of producing stable and reproducible ultra-short lasing radiation pulses by reducing in stages the duration of incoming pumping pulses to produce said ultra-short pulses, comprising: exciting a first dye laser cavity of a series of at least two cascaded dye laser cavities with input lasing radiation pulses, directing lasing radiation pulses emerging from each dye laser cavity of said series into the next successive dye laser cavity of said series, the photon cavity lifetime of each dye laser cavity of said series being sufficient for a given duration of said incoming pumping pulses to produce said ultra-short pulses emerging from the final dye laser cavity of said series, the maximum photon cavity lifetime of each dye laser cavity of said series being selected to thereby reduce in stages the duration of said incoming pumping pulses to yield said ultra-short pulses from the final dye laser cavity of said series.

* * * * *